United States Patent Office 3,213,448
Patented Oct. 19, 1965

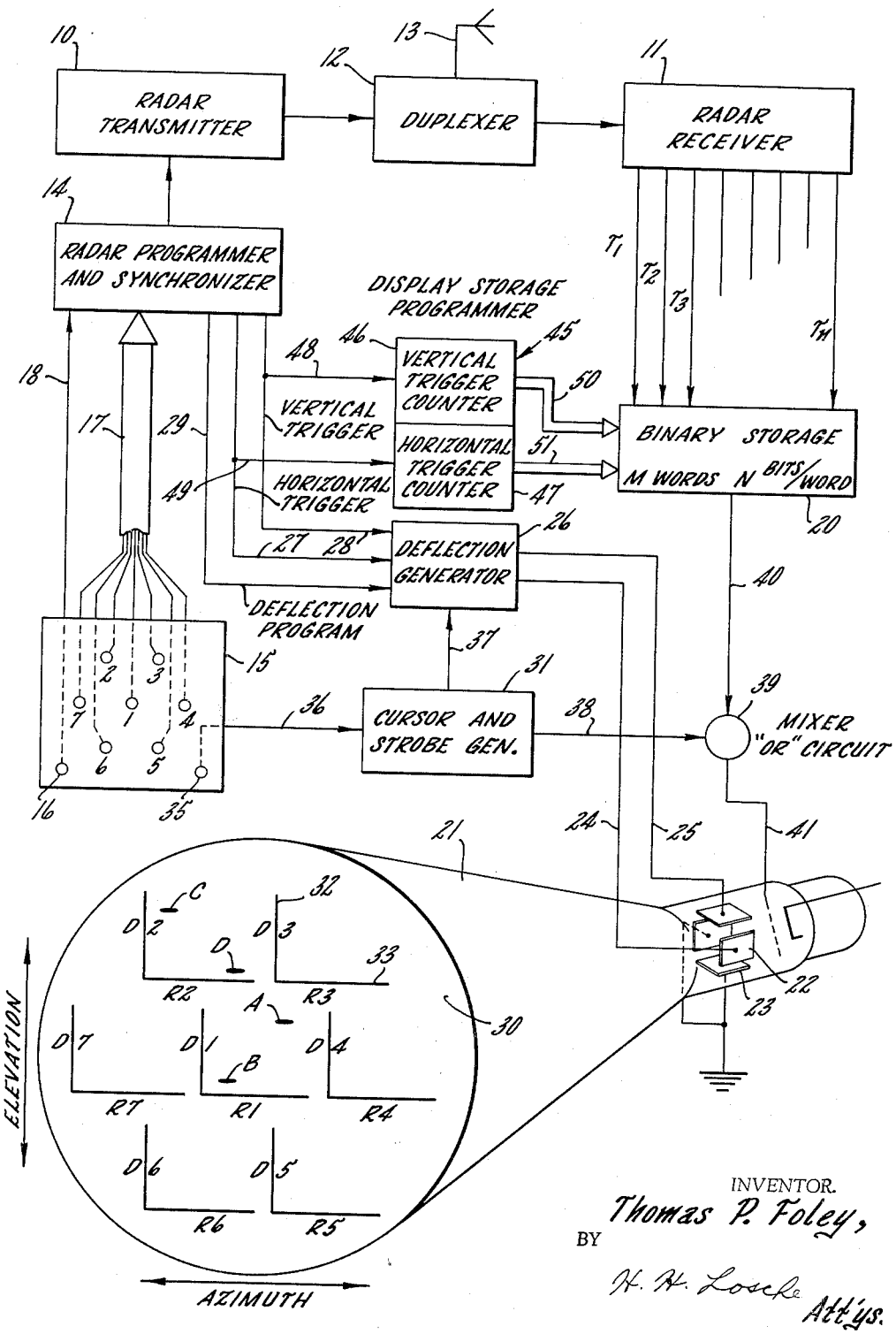

3,213,448
FOUR-DIMENSIONAL ACQUISITION DISPLAY
Thomas P. Foley, Severna Park, Md., assignor, by mesne assignments, to the United States of America as represented by the Secretary of the Navy
Filed Nov. 26, 1963, Ser. No. 326,308
8 Claims. (Cl. 343—9)

This invention relates to means of target acquisition and tracking by Doppler radar and more particularly to a means of subjectively displaying target objects acquired and tracked in a four-dimensional volume of Doppler, range, azimuth, and elevation on a planar cathode ray tube by orthogonal maps of range versus Doppler for several hexagonal radar beam positions on and about a central designated position.

In most tracking radars, a means of displaying the acquisition volume bounded by preset azimuth angle, elevation angle, and range segments has been solved by subjective display presentations of the quantities on a planar cathode ray tube screen. The fourth dimension of Doppler is needed to determine the speed and direction of the target object for threat evaluation.

This invention is used in conjunction with a coherent phased-array Doppler radar system in which the Doppler signals of target objects are filtered into Doppler filter channels in accordance with their Doppler frequencies for real times, range readout at points of display or use. The radar antenna array is phased in steps to obtain step scanning, rather than continuous scanning, which allows a means of presenting the dimensions of azimuth and elevation in addition to the dimensions of range and Doppler on a planar display tube to provide a four dimension target acquisition display.

In this invention a radar programmer is controlled to program the radar antenna array phasing in sequential steps to scan in a hexagonal beam motion which is displayed in like manner on a cathode ray display tube. The display tube has a deflection generator connected therewith under the control of the radar programmer to cause a display of targets in accordance with their Doppler signal and range in the hexagonal position corresponding to the direction of the radar acquisition beam in space. A cursor and strobe generator is also used in the deflection circuit to present strobe lines for the cathode ray tube displays to present in a sequential manner the six hexagonal areas scanned in space and the central scanned area. The readout of the radar receiver is stored in binary form in a binary storage means. A display storage programmer, triggered by the radar programmer, will start and end the range aperture to be displayed, converting range into counts of display increments, and will supply outputs to the binary storage circuits to advance the binary storage readout through the range increments at the rate of sampling by the application of the vertical and horizontal counter outputs. The displays of range versus Doppler in sequence centrally and in six hexagonal positions about the center, corresponding to the radar hexagonal scanning in space, provide dimensions of azimuth and elevation of targets in the scanned areas. It is therefore a general object of this invention to provide a cathode ray tube display of the acquisition of targets by a phased-array Doppler radar sequenced to scan in stepped hexagonal areas about a central scan, the displays each being of range versus Doppler plots centrally and in six hexagonal plots about the central plot corresponding to radar scan providing azimuth and elevation information as well as range, speed, and direction of the targets.

These and other objects and the attendant advantages, features, and uses will become more apparent to those skilled in the art as the description proceeds when considered along with the drawing illustrating the invention in a block circuit schematic diagram with information passing over conductor means in the direction indicated by the arrows.

Referring more particularly to the figure of drawing, a radar transmitter 10 and radar receiver 11 used in a system with a duplexer 12 and an antenna array 13 are shown coupled for transmission and reception of pulse-Doppler signals, in a manner well understood by those skilled in the pulse-Doppler radar art. It is also understood that an antenna array, as illustrated by 13, can be made to scan in various angles by phasing the antenna array without the mechanical movement of any of the antenna elements. A radar programmer and synchronizer circuit 14 is shown coupled to the radar transmitter 10 to program the phasing of the radar antenna array in a manner to accomplish radar scanning sequentially in a plurality of angular scan areas. For the purpose of this invention it is desirable to so phase the antenna array to scan centrally, or in alignment with the antenna, and, in addition, in six equal angular areas or hexagonal directions about this central scan, as will later become clear in the description of the invention.

The radar programmer and synchronizer circuit 14 is programmed by a console of operator controls 15 including thereon push buttons 1 through 7 corresponding to the central and six scanned areas. The push button 16 is operative to change the program to cause the radar to remain in a track mode of one of the central or six area scans. The push buttons 1 through 7 and the track initiating button 16 are each circuited (not shown) in a manner to apply proper voltages to the radar programmer and synchronizer circuit 14 through the cable means 17 and the conductor means 18. The radar programmer and synchronizer circuit 14 includes a switching circuit, horizontal and vertical trigger circuits, and sequencing means. The switching circuit may be of a diode matrix of the type disclosed in the text Digital Computer Components and Circuits by Richards, 1957, FIGURE 2–12, where the inputs to the matrix will be coupled to the switch outputs 1 through 7 of the operator control panel 15 of applicant's device. The diode switch matrix will switch in the proper phase shifts to the radar transmitter 10 for the antenna array 13 to activate pulse Doppler transmission corresponding to the pushbuttons 1 through 7 selected. The phasing of the array antenna 13 is accomplished in a manner more fully described in Section 7.7 of the text Introduction to Radar Systems by Skolnik, 1962. The horizontal and vertical trigger circuits in the radar programmer and synchronizer 14 may be of the conventional type used in most all radar circuits to synchronize the sweep generators for the cathode ray tube display and transmitted pulses, as more fully described in the text of Massachusetts Institute of Technology, Radiation Laboratories Series, volume 1, Radar System Engineering by Ridenour, Section 12–2. The sequencing means in the radar programmer and synchronizer 14 may be of any well known device to sequence the operation of the antenna array after all of the pushbutton switches 1 through 7 in the console 15 are actuated. The actuator of pushbutton 16 will halt the sequencing means, as aforesaid, to hold the radar transmission over the antenna selected to track targets in this selected center or any one of the six angular areas.

The radar receiver 11 is of a type to range gate the target echo signals and to filter the target echo signals in accordance with their Doppler frequency in filter banks of each range gated channel. Such a radar receiver system is more fully disclosed in the text Introduction To Radar Systems by Skolnik, 1962, Section 4.4. The outputs of radar receiver 11 are threshold detected as shown in the above text so that any target signal of sufficient strength to exceed the threshold will pass over one of the outputs T1, T2, T3, etc., to T$n$ as a binary digital bit since the output of the threshold detectors are either zero or a voltage of the amplitude of target strength exceeding the threshold. The digital bits T1, T2, etc., are applied to a binary storage network 20 which may be of a magnetic core matrix type more fully explained in the text of Richards, supra, Chapter 8. The binary storage network will store M words of N bits per word, M being the corresponding range channel words with N bits of frequency signal for each word.

A cathode ray tube 21 has horizontal and vertical deflection plates 22 and 23, respectively, therein, one opposite plate of each of the horizontal and vertical deflection plates being grounded or otherwise coupled in an efficient manner to provide cathode ray tube beam deflection. The horizontal and vertical deflection plates are coupled by conductor means 24 and 25 to the outputs of a deflection generator 26 which is triggered from the radar programmer and synchronizer circuit 14 by way of conductor means 27 and 28, respectively. The vertical deflection triggers come by way of conductor means 28 and the horizontal deflection triggers come by way of conductor means 27 to trigger the deflection generator 26 in both the vertical and horizontal directions for the cathode ray tube 21. The deflection generator 26 is also coupled by way of a conductor means 29 to the radar programmer and synchronizer circuit 14 to applied voltage biases to the deflection circuits of the deflection generator 26 in a manner to cause the production of one central and six hexagonal displays on the cathode ray tube screen 30, as shown by the seven orthogonal maps or displays D1, R1 through D7, R7, although these displays will not appear simultaneously in practice. These voltage biases would be switched by the diode matrix corresponding to the antenna phase selected from pushbuttons 1 through 7 on console 15. The deflection generator 26 may be of any known type to produce special waveforms for cathode ray tubes as more particularly shown and described in the text Radiation Laboratory Series, volume 19, on "Waveforms" 1949, by Chance et al., Chapter 8. The deflection generator 26 may be further modified in its generation in deflection currents by the output of a cursor and strobe generator 31 which is used to produce the vertical and horizontal strobe lines 32 and 33 on the cathode ray tube screen 30 for each of the seven orthogonal displays. The cursor and strobe generator 31 may be gated by push button 35 on the control console 15 which is coupled by conductor means 36 to the cursor and strobe generator 31. The output of the cursor and strobe generator 31 produces voltages on the deflection circuits of the deflection generator 26 by way of the conductor means 37 while the intensity output for the generator 31 is over the output 38. The cursor and strobe generator 31 may be of any known type to produce "tags" on other "lissajous" figures on the cathode ray tube screen as more fully described in the text Pulse and Digital Circuits by Millman and Taub, 1956, pages 544–547. The output 38 is coupled as one input to a mixer "OR" circuit 39, the second input to the mixer "OR" circuit 39 coming by way of conductor means 40 from the binary storage network 20 and the output 41 of the mixer "OR" circuit 39 being coupled to the screen control grid of the cathode ray tube 21.

Readout or sampling of the binary storage network 20 is produced by a display storage programmer circuit 45 consisting of a vertical trigger counter 46 and a horizontal trigger counter 47. The vertical trigger counter 46 is coupled to the vertical trigger output 28 of the radar programmer and synchronizer circuit 14 by way of the branch conductor 48, while the horizontal trigger counter 47 is coupled to the horizontal trigger output 27 of the radar programmer and synchronizer circuit 14 by way of branch conductor 49. The vertical trigger counter 46 provides a plurality of bit counter outputs over the cable means 50 to the binary storage network 20, and the horizontal trigger counter 47 has a plurality of digital bit counter outputs over the cable conductor means 51 to the binary storage network 20. The vertical and horizontal trigger counters are each of the ring counter type to produce digital outputs sequentially down the digital bit counter string. The counter outputs from the vertical trigger counter 46 over the cable means 50 are looped through the magnetic cores storing the same Doppler frequency in each range channel, one each digital bit output of the vertical trigger counter 46 being coupled to each string of magnetic storage core members storing the same Doppler frequency in each range channel. In like manner the horizontal trigger counter 47 has one each digtial bit counter loop through the string of storage magnetic cores in the binary storage network 20 corresponding to the range channel looping all of the magnetic cores from the lowest to the highest Doppler frequency stored in that range channel. As the vertical and horizontal trigger counters pulse the frequency and range channel cores, there will be a destructive readout of the cores having a stored signal therein receiving the horizontal and vertical pulses from the trigger counters 46 and 47. The digital bit counters in the vertical trigger counter circuit 46 should be equal in number to the number of magnetic cores in each string storing each Doppler frequency band of a target echo signal. For example, if each range channel has a bank of ten Doppler frequency filters, there should be ten magnetic storage cores, one for each Doppler filter. Likewise, if there are ten range channels there should be ten rows of ten magnetic storage cores for each channel. The binary storage network, therefore, would consist of one hundred magnetic storage cores coupled in a vertical and horizontal matrix which will be read out destructively as the horizontal and vertical trigger counters sequentially sample each core, as may be well understood from the means of reading out such magnetic core networks explained in the above-mentioned text of Richards, Chapter 8. Likewise, each horizontal and vertical counter should have corresponding digital bit outputs with the core strings to provide the sampling of each core. Readout of the binary storage network 20 will be by way of the conductor means 40 to the mixer "OR" circuit 39 to produce intensity marks on the cathode ray tube screen 30 by virtue of these outputs being applied to the grid of the cathode ray tube 21.

*Operation*

In the operation of the device let it be assumed that the only program set in is by depressing push button 1 on the control console 15 which establishes a program on the radar transmitter and receiver system to phase the antenna array 13 to scan in straight alignment therewith. At the same time the deflection generator 26 is programmed to produce a raster in the central area of the screen 30. Push button 35 may be depressed to cause the cursor and strobe generator 31 to produce the lines 32 and 33 for the central orthogonal display D1, R1. Strobe line 32 for D1 on the orthogonal display is the ordinate representative of the Doppler frequency of a target while the strobe line 33 for R1 is the abscissa representative of the range of a target object. Frequency increases with increase in height along D1 while range increases from left to right along R1. As the radar scans the central area, any targets therein will be received in the radar receiver and pass through the several range channels to be sorted by Doppler frequency in the filter banks and stored in the binary network or matrix 20 in accordance with their Doppler frequency bands for each range channel. The vertical trigger counter 46 and the horizontal trigger counter 47 will produce count outputs to sample the storage elements of the network or matrix 20 which will produce voltage pulses on the grid of the cathode ray tube 21 to produce intensity modulation on the beam of the cathode ray tube. The central orthogonal display D1, R1 indicates targets A and B in the central scanned area. Target A is of high Doppler frequency and of considerable range while target B is of low Doppler frequency and close range. Whether targets A and B are opening or closing targets will depend on whether the Doppler frequency is above or below the transmitted frequency. Also the speed of A and B can be determined by the Doppler frequency as to the amount of frequency change from the transmitted frequency as well understood by those skilled in the pulse Doppler radar art. Observation of the movements of targets A and B on screen 30 will show whether these targets are increasing or decreasing in range or whether they are increasing or decreasing in speed in accordance with their Doppler frequency. Changes in range will indicate direction of the target.

If now program button 2 on the control console 15 is depressed, the radar transmitter 10 and antenna 13 will be phased to cause the scan of the radar to be angularly deflected along a 330° line from the control scan to scan the area illustrated by D2, R2 on the orthogonal display now produced on the cathode ray tube 21. The orthogonal displays D1, R1 through D7, R7, as they appear, are positioned in exact coincidence with the position of the radar scan so that azimuth and elevation of detected targets can be determined from this orthogonal display as well as the speed, direction, and range of the target or targets by target movement and Doppler position and range position on the display tube screen 30. In the display D2, R2 two targets C and D are shown in which C is of high Doppler frequency and close range while D is of low Doppler frequency and long range. This indicates that target C is traveling at high speed with respect to own station and is at close range, while target D is traveling at low speed with respect to own station and at long range. The orthogonal display D2, R2 provides elevation and azimuth by its position on the cathode ray tube screen which corresponds to the scanned area of the radar.

In like manner complete scanning of a large conical area forward of the radar can be accomplished by programming radar scans in a desired sequence of actuating the push buttons 1 through 7 on the console 15. For example, if push buttons 1 through 7 are depressed in their numerical order, the radar programmer and synchronizer circuit 14 will program radar transmission to provide sequential scanning and sequential orthogonal displays D1, R1; D2, R2; D3, R3; etc., through D7, R7, and back to D1, R1 for repeated scanning of an extensive area forward of the radar. At any time it is desirable in this programmed sequence of scans to track targets in a particular scanned area, the push button 16 may be depressed to program the radar to scan in one particular area, such as the central scan or any one of the six hexagonal scans of the radar. In this manner four informational dimensions of the target are provided on each orthogonal display, these being the Doppler frequency or speed and direction, the range, the azimuth, and the elevation of the target or targets.

While many modifications and changes may be made in the constructional details and features of this invention, it is to be understood that I desire to be limited in the spirit and scope of my invention only by the scope of the appended claims.

I claim:

1. In a phased-array Doppler radar system, a four-dimensional acquisition display comprising:
   a phased-array Doppler radar system having a radar synchronizer and a programmer settable for programming radar scan in any sequence over a central and six surrounding adjacent areas;
   a binary storage means coupled to receive signal outputs from said system;
   a display storage programmer coupled to said radar synchronizer and programmer and to said binary storage means to advance the binary storage through range increments at the rate of synchronized pulses from said synchronizer on the output of said binary storage means; and
   a cathode ray display tube with associated deflection circuits therefor, said display tube being coupled to said binary storage output and said deflection circuits being coupled to said radar programmer to produce central and six adjacent displays corresponding to said scanned areas whereby target acquisition is displayed in range versus Doppler displays and in azimuth and elevation by the corresponding areas of scan.

2. In a phased-array Doppler radar system, a four-dimensional acquisition display comprising:
   a phased-array Doppler radar system having a radar programmer and synchronizer circuit settable for programming radar scan in any sequence over central and six surrounding adjacent areas in space;
   a binary storage means coupled to said radar system to receive a plurality of target signals in a plurality of storage elements according to their frequency bands;
   a display storage programmer coupled to said radar synchronizer and programmer and to said binary storage means to advance the binary storage through range increments at the rate of synchronized pulses from said synchronizer circuit on the output of said binary storage means;
   a cathode ray display tube and associated deflection circuits therefor, said display tube being coupled to said binary storage output and said deflection circuits being coupled to said radar programmer to produce central and six adjacent target displays in correspondence with the scanned areas in space; and
   cursor and strobe producing means coupled to said deflection circuits and to said cathode ray display tube to produce a plot of abscissa and ordinate lines for each center and sector display of the range and Doppler frequencies of target echoes whereby the four dimensions of range, Doppler, azimuth, and elevation of each target are displayed.

3. A four-dimensional acquisition display as set forth in claim 2 wherein
   said radar programmer and synchronizer circuit settable for programming radar scan includes an operator control station of push buttons actuatable to program the radar scan in any sequence of said central and six areas in space, to place said radar in a target tracking mode, and to gate in cursor and strobe lines on said cathode ray tube display.

4. A four-dimensional acquisition display as set forth in claim 3 wherein
   said input to said cathode ray tube from said binary storage means and said cursor and strobe producing means is through a mixer "OR" circuit.

5. In a phased-array Doppler radar system, a four-dimensional acquisition display comprising:
   a radar programmer and synchronizing component coupled to the radar system to phase the antenna array to scan in a central and six surrounding adjacent hexagonal areas of scan;
   a binary storage means coupled to the radar receiver of the radar system for receiving and storing target echo signals in binary form in a plurality of storage elements, each storage element being responsive to a frequency within a band of frequencies within a range gate for the plurality of storage elements;
   a cathode ray display tube with associated deflection circuits, said deflection circuits being coupled to said radar programmer to produce display of the center and six adjacent areas in correspondence with the programmed scanned areas by the radar, said cathode ray tube being coupled to said binary storage means to display stored target echoes in the programmed sequence of scanned areas;

a display storage programmer coupled to said radar programmer and synchronizing component and to said binary storage means to advance the binary storage through range increments at the rate of synchronized pulses from said synchronizing component on the output of said binary storage means; and cursor and strobe generator means coupled to said deflection circuits and to said cathode ray tube to intensify a plot of abscissa and ordinate strobe lines for each display to provide the Doppler frequency and the range of the targets displayed at the azimuth and elevation provided by the position of the display in its central and hexagonal location on the cathode ray tube screen whereby the four dimensions of all target echoes will be displayed.

6. A four-dimensional acquisition display as set forth in claim 5 wherein said radar programmer and synchronizer component includes an operator control console having push buttons thereon actuatable for programming radar scans in any sequence of the central and hexagonal areas of scans, for programming target tracking, and for programming cursor and strobe gating, said gating control push button being in an electrical circuit coupled to said cursor and strobe generator means to gate in said cursor and strobe abscissa and ordinate lines for said target displays.

7. A four-dimensional acquisition display as set forth in claim 6 wherein said coupling of said binary storage means to said cathode ray tube and of said cursor and strobe generator to said cathode ray tube is through a mixer "OR" circuit to the grid of said cathode ray tube.

8. A four-dimensional acquistion display as set forth in claim 7 wherein said display storage programmer is a binary counter means coupled to said radar programmer and synchronizing component to count the horizontal and vertical synchronizing pulses to produce on its outputs a count defining the start and end of the range aperture to be displayed, this range aperture being range counts of display increments.

References Cited by the Examiner

UNITED STATES PATENTS

| | | |
|---|---|---|
| 2,415,566 | 2/47 | Rhea. |
| 3,121,856 | 2/64 | Finney _____ 343—9 X |
| 3,134,974 | 5/64 | Orenstein. |

CHESTER L. JUSTUS, *Primary Examiner*.